E. G. LATTA.

TYPE WRITING MACHINE.

APPLICATION FILED MAY 24, 1918.

Reissued July 23, 1918.

14,495.

6 SHEETS—SHEET 1.

Inventor

Emmit G. Latta

By Criswell & Davis

Attorneys

E. G. LATTA.

TYPE WRITING MACHINE.

APPLICATION FILED MAY 24, 1918.

Reissued July 23, 1918.

14,495.

6 SHEETS—SHEET 2.

Inventor
Emmit G. Latta
By Crowell & Davis
Attys

E. G. LATTA.

TYPE WRITING MACHINE.

APPLICATION FILED MAY 24, 1918.

Reissued July 23, 1918.

14,495.

6 SHEETS—SHEET 3.

Inventor
Emmit G. Latta
By Crosby & Dams
Attys

E. G. LATTA.
TYPE WRITING MACHINE.
APPLICATION FILED MAY 24, 1918.
Reissued July 23, 1918.
14,495.
6 SHEETS—SHEET 4.
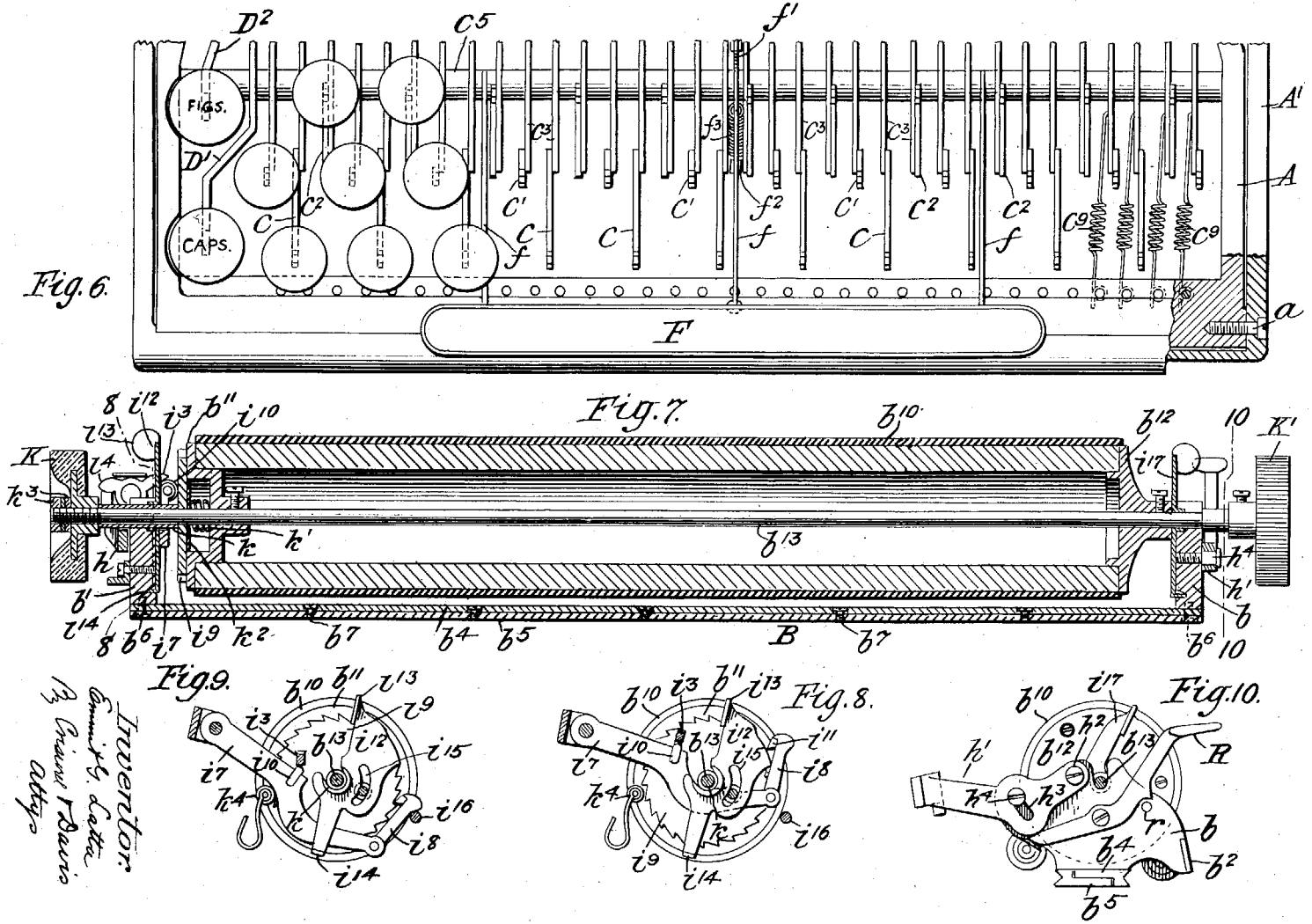
Inventor:
Emmit G. Latta
By Crosby & Davis
Attys E. G. LATTA.
TYPE WRITING MACHINE.
APPLICATION FILED MAY 24, 1918.
Reissued July 23, 1918.
14,495.
6 SHEETS—SHEET 5.
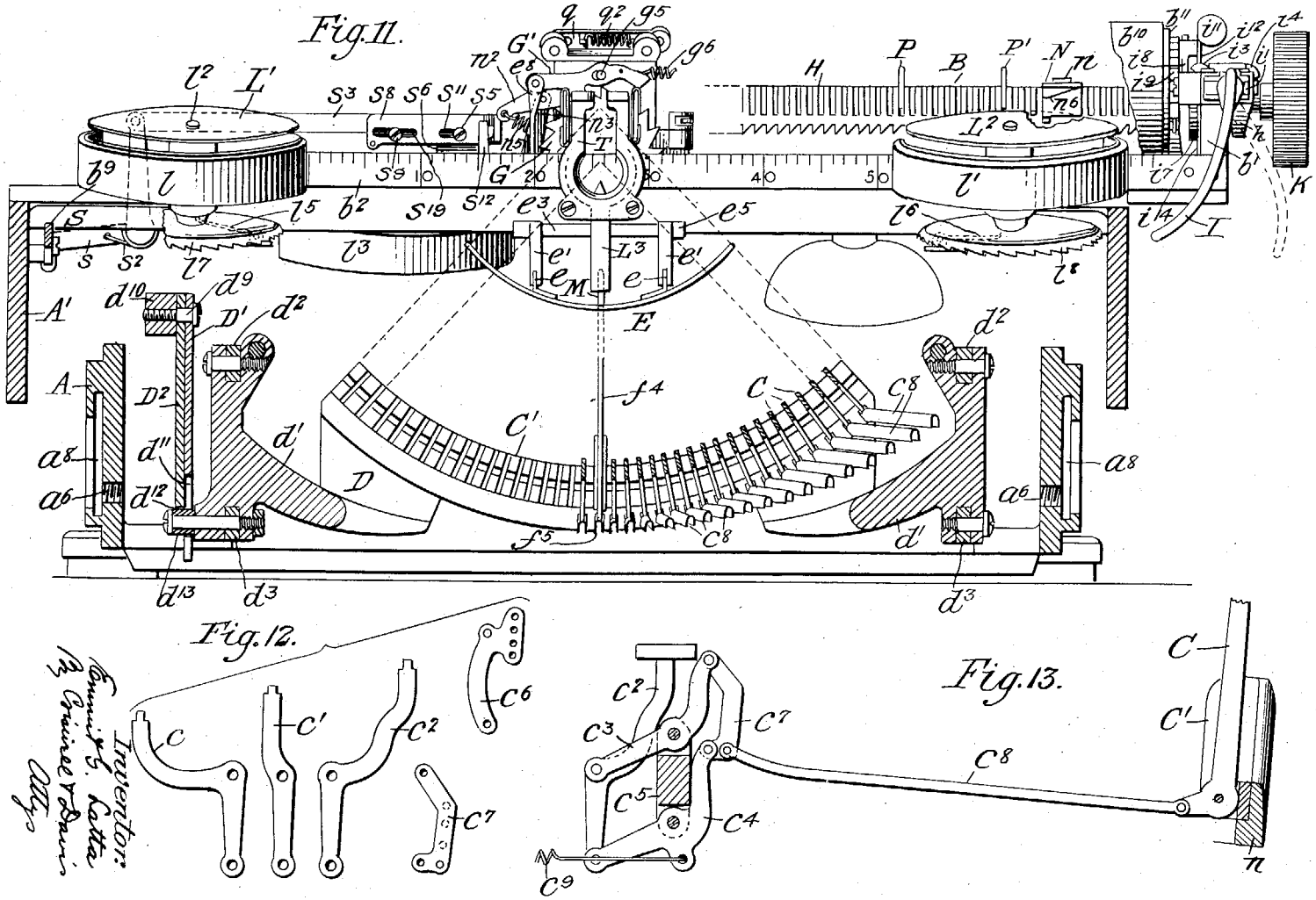
Inventor:
Emmett G. Latta
By Crisinel & Davis
Attys E. G. LATTA.
TYPE WRITING MACHINE.
APPLICATION FILED MAY 24, 1918.
Reissued July 23, 1918.
14,495.
6 SHEETS—SHEET 6.
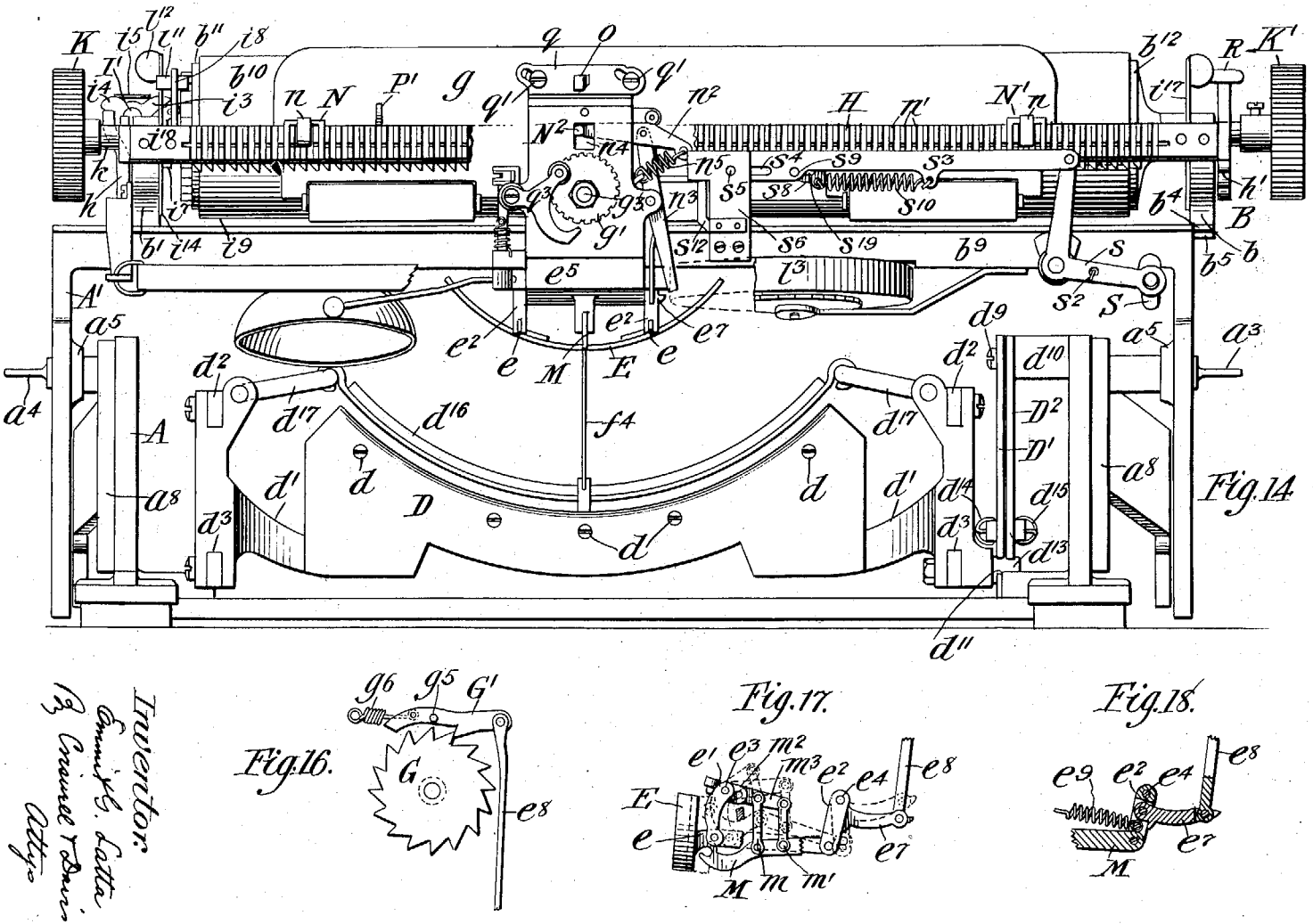
Inventor:
Emmit G. Latta
By Criswell & Davis
Attys.

UNITED STATES PATENT OFFICE.

EMMIT G. LATTA, OF SYRACUSE, NEW YORK, ASSIGNOR TO CORONA TYPEWRITER COMPANY, INC., A CORPORATION OF NEW YORK.

TYPE-WRITING MACHINE.

14,495. Specification of Reissued Letters Patent. Reissued July 23, 1918.

Original application filed November 2, 1911, Serial No. 658,153. Renewed October 14, 1916, Serial No. 125,702. Original No. 1,222,550, dated April 10, 1917. Application for reissue filed May 24, 1918. Serial No. 236,440.

*To all whom it may concern:*

Be it known that I, EMMIT G. LATTA, a citizen of the United States, residing at Syracuse, in the county of Onondaga and State of New York, have invented a new and useful Improvement in Type-Writing Machines, of which the following is a specification.

This invention relates to improvements in typewriting machines, and its primary object is to provide a practical and efficient portable typewriting machine of the front strike or visible writing sort which is capable of being readily collapsed or closed into small compass, adapting it to be conveniently carried from place to place.

Other objects of the invention are to provide a small, compact, visible writing typewriter of comparatively inexpensive construction, which is adapted to perform all of the functions required of the larger and more expensive up-to-date typewriters of the most approved design; to construct and arrange the various parts and devices of the machine so that the machine can be put in condition for writing and collapsed for transportation with the minimum delay and inconvenience; and to improve typewriting machines in the several respects hereinafter described and set forth in the claims.

These objects are accomplished by the novel construction of the machine which, briefly stated, is as follows:

The main frame of the machine, or frame which supports the various operative parts of the typewriter consists of a stationary section, frame or base which is adapted to rest on a supporting surface and on which are mounted the type bars, finger keys and case shifting mechanism; and a movable section or frame which is mounted on the stationary frame so that it can be moved up and down relative thereto and on which are mounted the paper carriage, together with the platen and carriage actuating mechanisms, the ink ribbon and its operating mechanisms and other parts associated with the carriage. One of the frames or frame sections is adapted to surround and receive the other, and the parts mounted thereon are arranged so that when the machine is collapsed, or the movable frame is lowered relative to the stationary frame, the parts mounted on one frame will be received into spaces provided therefor between the parts mounted on the other frame. The parts which are carried by the movable frame are preferably disconnected from their actuating keys or devices which are mounted on the stationary frame, so that in collapsing the machine it is not necessary to disconnect any parts or shift the operative parts from their normal position.

In the accompanying drawings consisting of six sheets:

Fig. 6 is a plan view of the keyboard at the front end of the machine, which is not shown in Fig. 5.

Fig. 7 is a sectional elevation of the platen and paper carriage, as viewed from the rear.

Fig. 8 is a sectional elevation thereof on line 8—8, Fig. 7.

Fig. 9 is a similar view, showing the line space pawl at the end of its throw.

Fig. 10 is an elevation partly in section, line 10—10, Fig. 7.

Fig. 11 is a transverse sectional elevation of the machine in line $x$—$x$, Fig. 3, portions of the carriage being broken away to disclose parts in the rear thereof.

Fig. 12 is an elevation of the different forms of finger keys and the connecting links for their supporting levers, the parts being disconnected.

Fig. 13 is an elevation of one of the type bar actions, showing the position of the parts when the type bar is at the platen.

Fig. 14 is a rear elevation of the machine, parts of the carriage escapement being moved to disclose the parts in front thereof.

Fig. 16 is a rear elevation of the carriage escapement.

Fig. 17 is a side elevation of the universal bar and ribbon vibrating mechanism detached.

Fig. 18 is a transverse sectional elevation of the escapement actuating mechanism.

Like reference characters refer to like parts in the several figures.

The drawings show the actual size of the parts of the machine. It will be seen from Figs. 1, 5 and 6, the machine when collapsed occupies a space of approximately 11x11x2$\frac{9}{16}$ inches, or about one-third of the average space required for other front strike type bar machines, and in order to accomplish this the parts have been arranged so that the machine can be collapsed approximately to the height of the keyboard. To enable this and to provide parts that accomplish all that is required in a modern typewriting machine in a satisfactory manner, necessitated a novel construction and relative arrangement of the various parts of the machine, as hereinafter described.

Figure 1:
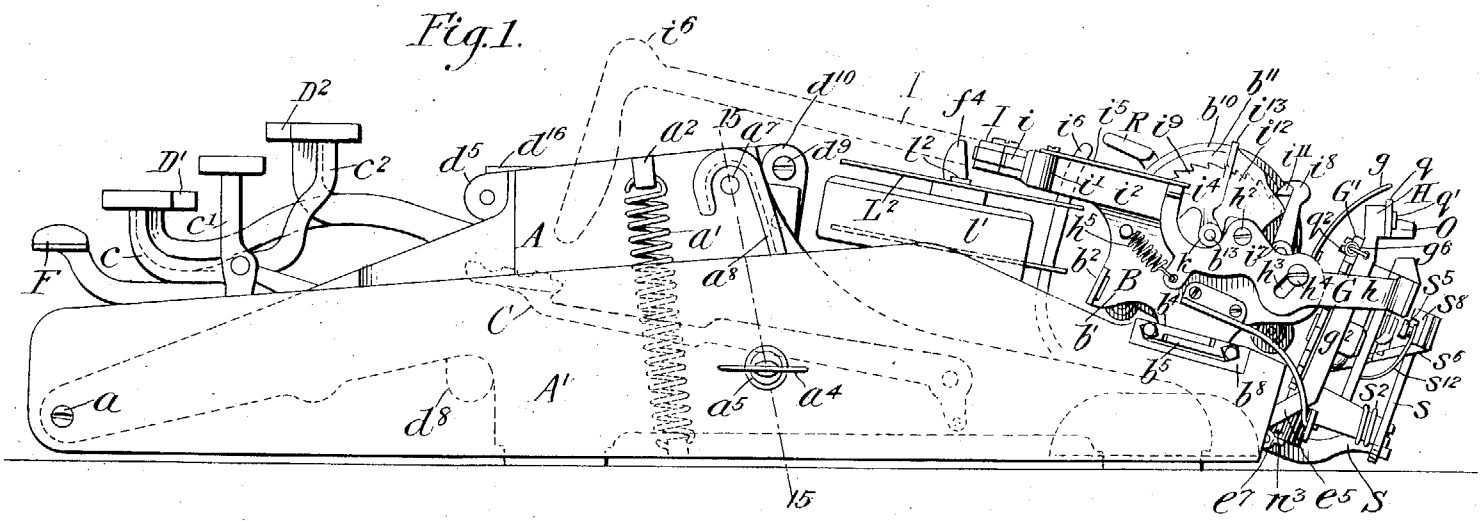
Figure 1 is a side elevation of a typewriting machine, embodying the invention, showing the same collapsed.
Figure 2:
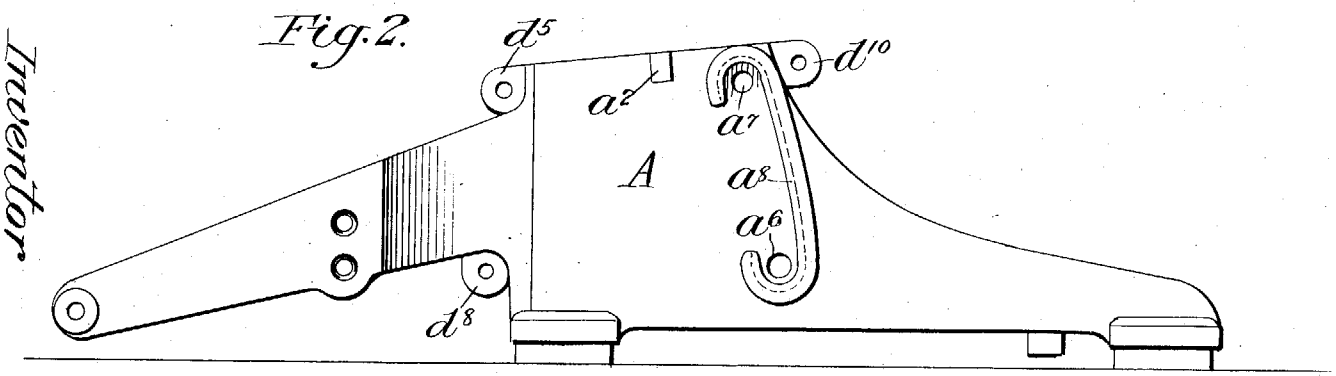
Fig. 2 is a side elevation of the base or stationary frame section.

A and A′ represent respectively the base or stationary section of the main frame and the movable frame section. Each of these parts consists of a rigid substantially rectangular frame, provided with suitable lugs or parts for the attachment of the various operative parts mounted thereon. The movable frame is preferably larger than and surrounds the stationary frame A and is pivotally connected thereto at its front end by pivots at opposite sides of the machine. One of the pivots $a$, which may be of any suitable construction, is shown in Figs. 1 and 6. The frames are connected at opposite sides by a pair of coil springs $a'$, Figs. 1 and 5, which tend to raise and support the movable frame in the elevated position shown in Fig. 3. As shown, these springs are hooked at their upper ends into lugs $a^2$ projecting outwardly from the sides of the stationary frame A and at their lower ends are hooked into inwardly projecting lugs on the sides of the movable frame A′. These springs are preferably of sufficient strength to hold the movable frame with the parts mounted thereon in the elevated operative position when permitted so to do. $a^3$ $a^4$ represent two thumb screws which are seated in studs $a^5$ on the sides of the movable frame and are adapted to be screwed into lower and upper screw threaded holes $a^6$ $a^7$ in the sides of the stationary frame A. The studs $a^5$ are rigidly seated in the sides of the frame A′ and are provided at their inner ends with circular flanges which engage and are adapted to slide in curved guides or slots $a^8$ on the sides of the stationary frame A. These slots or guides are concentric with the pivots for the movable frame A′. When the machine is shipped from the manufacturers, and when not in use the movable frame is secured in the lower position shown in Fig. 1, by screwing the thumb screws into the lower holes $a^6$. To make ready for use it is only necessary to unscrew the screws from the lower holes, when the springs will raise the movable frame, and preferably screw the screws into the upper holes $a^7$, and swing the line space lever hereinafter described to the front. The springs will hold the movable frame in its elevated position and the machine can be used without inserting the screws into the upper holes $a^7$, but it is preferable to lock the frames A and A′ rigidly together by the screws if the machine is to be used to any considerable extent.

B represents the paper carriage which is mounted to travel horizontally crosswise of the machine on the rear portion of the movable frame A′. The carriage may be of any suitable construction and be slidably mounted on the frame A′ in any suitable manner. Preferably, the carriage consists of opposite end pieces or plates $b$ $b'$ connected at their front portion by a scale bar $b^2$, at the rear by a rod or bar $b^3$ and at the bottom by a track or guide bar, consisting of two sections $b^4$ and $b^5$. These track bar sections are steel bars machined to the cross sectional shape shown in Fig. 3 and are secured to each other and to the ends of the carriage by screws, $b^6$ indicated by dotted lines in Fig. 7. The overlapping portions of the track sections are also secured together at intervals by screws $b^7$, Fig. 7. $b^8$ represents a grooved guide or track bar which is secured at suitable intervals by screws, not shown, in a recess in the rear cross bar $b^9$ of the movable frame A′. This bar is machined to form opposable ball races and the carriage track bar extends into the grooved track bar $b^8$, suitable anti-friction balls being interposed between the races in the bar $b^8$ and complementary races formed in the front and rear edges of the sectional carriage track bar. This construction forms an anti-frictional ball bearing guide for the carriage of very compact construction which is required by reason of the limited space allowed for the carriage guide, and insures long life with the minimum friction in the track bearing. The holes for the screws in the track section $b^4$ are made of greater width crosswise of the track than the diameter of the screws, thereby enabling the track section $b^4$ to be adjusted on the other section to properly adjust the bearing.

$b^{10}$ represents the platen which may be of the usual or any suitable construction. It preferably consists of a hollow body provided with a suitable surface or covering and secured by end plates $b^{11}$ $b^{12}$ to a central shaft $b^{13}$ which extends through the platen and is journaled at its ends in the ends of the carriage, preferably as hereinafter described.

C represents the type bars which are pivotally mounted in any suitable manner in front of and below the carriage on a supporting segment C′ mounted on the stationary frame A. The type bars are arranged to swing upwardly and rearwardly to the platen and each bar has three characters, the supporting segment being mounted on a shift frame which is movable upwardly and downwardly from an intermediate position for placing one or another of the characters in printing relation with the platen. The segment C′ is shown as secured by screws $d$ to a shift frame D.

Figures 3, 4, 15:
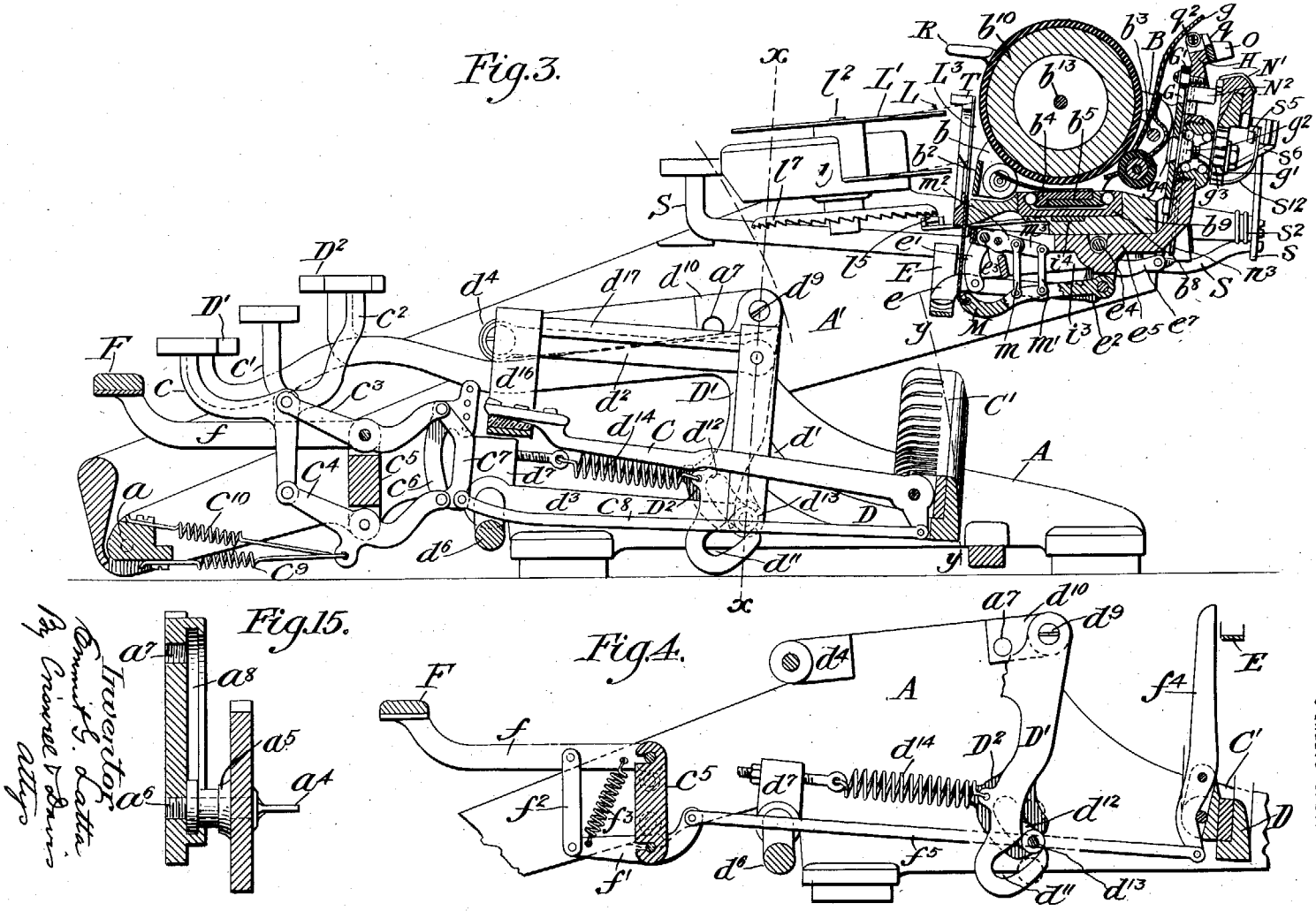
Fig. 3 is a longitudinal sectional elevation of the machine with the parts in their operative positions.
Fig. 4 is a fragmentary longitudinal sectional elevation of the base and the parts mounted thereon.
Fig. 15 is a fragmentary vertical section on line 15—15, Fig. 1.
Figure 5:
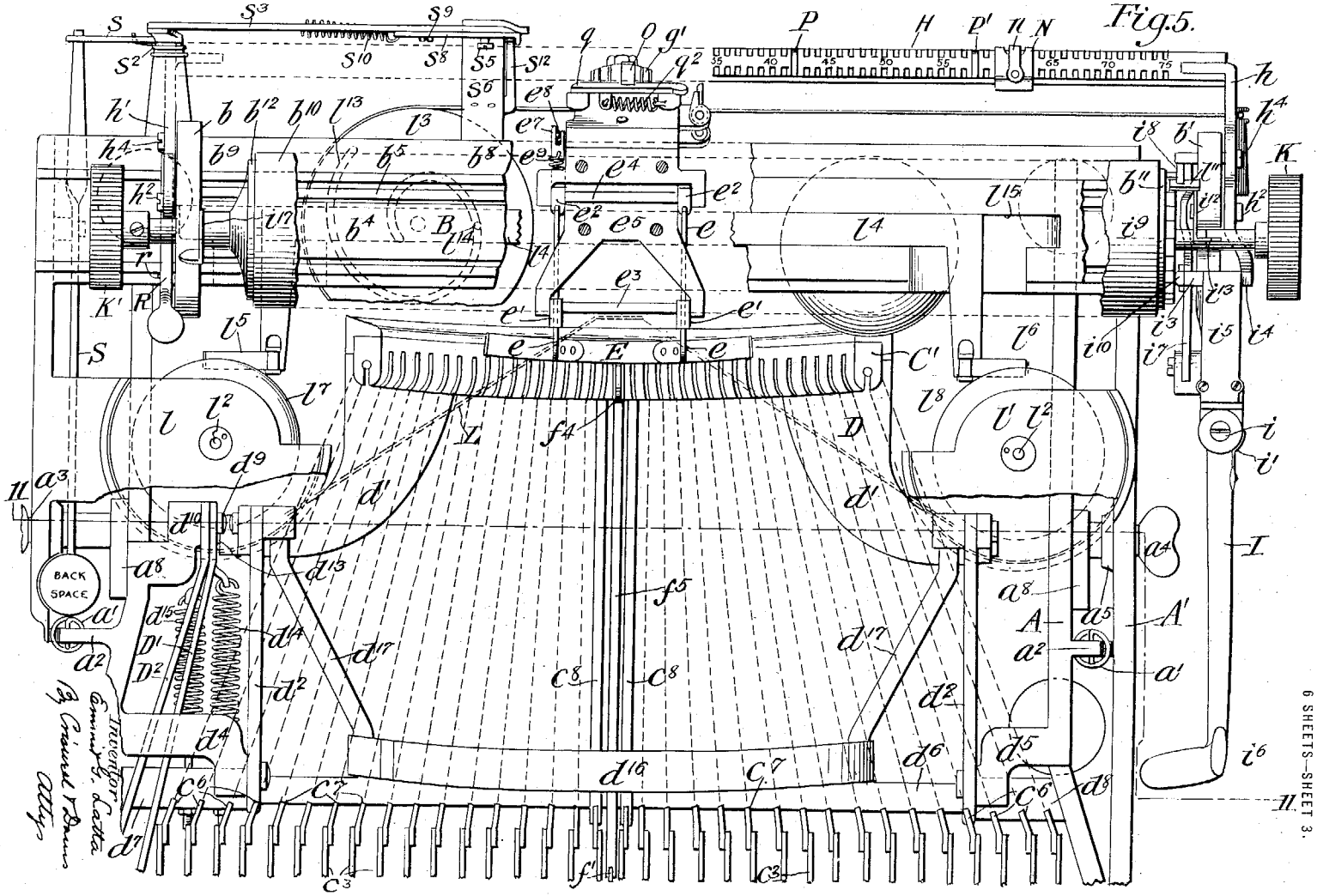
Fig. 5 is a fragmentary plan view of the machine, portions of the carriage and other parts being broken away to disclose the underlying parts.

The key actions for the type bars, as shown in Figs. 3, 4, 12 and 13, are formed of sheet metal stampings. The key stems $c$, $c'$, $c^2$, as clearly shown in Fig. 12, are made in three different forms for the three banks of keys and have downwardly extending portions pierced for shouldered rivets by which they are pivoted to the front ends of supporting levers $c^3$ $c^4$, each stem being pivoted to a pair of the levers. These levers $c^3$ $c^4$ are pivotally mounted, preferably in slots in the upper and lower edges of a fulcrum bar $c^5$ which is rigidly connected at its ends in any suitable manner to the sides of the stationary frame. The rear ends of the key levers $c^3$ $c^4$ are connected by links $c^6$ and $c^7$ which are of two forms, as shown in Fig. 12. Certain of the key levers, preferably four at each end of the keyboard, are connected by the links $c^6$ and all of the remaining levers of the series are connected by the links $c^7$. The links $c^6$ used at the ends of the keyboard are made of different shapes than the other links, so as not to interfere with other parts of the machine at the sides thereof. The links $c^6$ $c^7$ are connected to their respective type bars by long links $c^8$, two of which are shown in Fig. 5. These links are all of the same length and are preferably of inverted U-cross section and embrace the parts to which they are pivotally connected at their ends. The links $c^8$ at the center of the series are curved, as shown in Figs. 3 and 13, so as not to strike the type bar basket when the segment is in its lower shifted position, but the remaining links may be straight, if desired. The links $c^8$ are made alike, each with four rivet holes, so this form of link can be used for either of eight different places, but as there is very little difference in the elevation of the front ends of the links $c^8$ where they connect to the links $c^7$, there is not sufficient room to make these links with rivet holes for all connections with the links $c^8$. The links $c^7$ are made with the lowermost holes, and the other holes required for connection to the several links $c^8$ are made at the proper points in the several links. The type bars and key actions are returned to the normal positions by springs $c^9$ $c^{10}$ which are attached to the lower key levers $c^4$ and to the front bar of the frame A, preferably by the heads of screws acting as clamps. The springs with the exception of one $c^{10}$ are secured to the under side of the front bar of the stationary frame, the spring $c^{10}$ being secured to the upper side of the bar to make room to actuate one of the center actions.

It will be observed that the keys for the three banks are all connected to the levers $c^3$ $c^4$ which are fulcrumed on the bar $c^5$. This bar with the two fulcrum wires for the levers extends the full length of the keyboard and is the only part of the key action that requires machining. This bar, as hereafter explained, also supports the space key, and as the other parts are all stampings, the complete action can be made at a low cost. As indicated in Fig. 5, except for a few of the links at the center of the series, the links $c^8$ diverge forwardly from the type bar owing to the greater length of the keyboard than of the segment, and the links $c^6$ $c^7$ are indicated as bent in rear of the key levers $c^3$ $c^4$ to extend in the direction of the links $c^8$. The same result of a direct pull on the links $c^8$ could be obtained by bending the supporting key levers $c^3$ $c^4$ in rear of their fulcrums. This action as a whole is unusually easy to operate, its touch and dip are almost exactly uniform for the several keys, and it enables the segment to be located very low in the machine so that the rear ends of the links $c^8$ barely clear the table on which the machine is used, the action thus materially assisting in reducing the height of the machine.

The shift frame D to which the type bar segment is secured, is provided with forwardly and outwardly projecting arms $d'$ having upright front portions which are pivoted at their upper ends in any suitable manner to the rear ends of a pair of supporting links $d^2$, and are pivoted in any suitable manner at their lower ends to the rear ends of a pair of supporting arms $d^3$. The links $d^2$ are pivotally mounted at their front ends in any convenient way to lugs $d^4$ and $d^5$ on the stationary frame A and the arms $d^3$ are rigidly attached at their front ends to a rock shaft $d^6$. This rock shaft is suitably journaled at its ends in lugs $d^7$ $d^8$ projecting from the sides of the stationary frame. The several pivot lugs on the frame A are offset as shown to permit them to be drilled and tapped advantageously. The central part of the rock shaft is curved downwardly to clear the central connecting links $c^8$ for the type bar.

D′ and D² represent two shift levers. These shift levers, which are of bell crank form, are preferably pivoted side by side on a pivot screw $d^9$ seated in the lug $d^{10}$ on one side of the frame A. The lower ends of these levers, see Figs. 3 and 4, are provided with curved cam slots $d^{11}$ $d^{12}$ acting on a roller $d^{13}$ suitably journaled on the adjacent side of the shift frame to move it up and down from its normal intermediate position shown in the drawings. The shift levers are returned after movement up or down to the intermediate position by springs $d^{14}$ $d^{15}$ which are connected to the shift levers and are anchored at their front ends by adjusting eye bolts to the lug $d^7$. The lug $d^4$ limits the return of the shift levers to the same normal position. As seen in Fig. 4, each cam slot acts to move the roller a certain distance in one direction and to form a stop to hold it in normal position and prevent its movement in the opposite direction, and the springs $d^{14}$ $d^{15}$ actuate the cam levers to restore the roller and the shift frame to their central positions when the levers are released. The weight of the shift frame is preferably balanced by a spring, not shown. As shown in Fig. 3, the type bar segment is located in a rearwardly inclined plane parallel with the line $x$—$x$, and the supporting links and arms for the shift frame are pivoted to the shift frame on line $x$—$x$, their front ends being pivoted in a plane parallel with this line, so that when in either of its shifted positions the segment will be in the same plane, and the action of the type bar will be the same in one position as in the other. In the normal central position of the shift frame the segment is so near the plane occupied by it when in its shifted positions that no difference in action is noticeable in the three positions. The links $c^6$ and $c^7$ of the type bar actions are arranged to connect with the link $c^8$ in a plane which is also parallel with the line $x$—$x$ and the links $c^8$ are connected to the type bar and to the link $c^6$ $c^7$ on lines at right angles to said plane of the segment when the segment is in the normal position. There can thus be no noticeable difference in the action of the type bars in the different printing positions thereof.

$d^{16}$ represents the type bar basket or back stop for the type bars, consisting of a curved metal strap and felt pad which is supported at its ends by arms $d^{17}$ which extend backwardly and outwardly and are connected to the upright portions of the arms of the shift frame.

E represents the universal bar which is arranged to be struck by the type bars as they approach the platen and which, as usual, is connected to the carriage escapement, so as to cause a letter space movement of the carriage each time a type bar is actuated to make an impression. The universal bar consists of a curved strip having two parallel rigidly connected rearwardly extending arms $e$ which are pivoted to the lower ends of two pairs of downwardly extending arms $e'$ $e^2$. These arms are rigidly attached at their upper ends to the ends of a pair of parallel rock shafts $e^3$ $e^4$ which are suitably journaled to lugs on a bracket $e^5$ which is secured in any suitable manner to the rear cross bar $b^9$ of the movable frame A′. One of the arms $e^2$, see Figs. 5 and 18, has an auxiliary arm $e^7$ pivoted thereto and extending rearwardly to a pivotal connection with an upright link $e^8$ which is connected at its upper end to the escapment lever of the carriage escapement, so that the escapement is actuated by the operation of the universal bar. A spring $e^9$ connected to the arm $e^2$ and to the bracket $e^5$ acts to hold the universal bar yieldingly in its normal position, see Fig. 3. The universal bar is arranged above and substantially concentric with the type bar segment in position to be struck by the type bars in each of the three positions of the segment. The type bars strike the universal bar near their longitudinal centers. The curved front edge of the universal bar stands in a plane parallel with the line $x$—$x$ and those parts of the type bars which strike the universal bar are in a parallel plane at the time they reach the printing point. The broken lines in Fig. 11 show the positions of the two type bars at the ends of the segment when at the printing point in the two shifted positions of the segment, and these lines indicate where the two outer type bars strike the universal bar when shifted either above or below their normal position. In the normal position of the segment they strike the universal bar between the broken line positions. Obviously the other type bars strike the universal bar at corresponding positions. Universal bars have been made to intercept the type bars at points near their fulcrums and also at points near their outer ends, but in the above construction the type bars strike the universal bar at points substantially midway between their ends and the universal bar maintains a fixed relation to the carriage while the type bar segment is shiftable. This construction not only permits of the compact build of the typewriter required, but produces a quicker action of the universal bar than when the bar is struck by the heels of the type bars, and it produces a longer-lived construction than either of the other arrangements because the wear is distributed between three different points on both the type bars and the universal bar.

F represents the space key or bar which, as usual, is arranged at the front central portion of the keyboard and is preferably fixed to three arms $f$, see Figs. 4 and 6, which are pivoted on the fulcrum bar $c^5$ by the upper wire pivot for the key levers. A lever $f'$, Fig. 4, fulcrumed on the lower pivot wire for the key levers is connected by a link $f^2$ to the central arm $f$. A spring $f^3$ connecting the outer end of the lever $f'$ to the inner end of the arm $f$ serves to hold the space key in its normal position and return it to this position when released after depression. $f^4$ represents an upright lever which is pivoted between its ends on a bracket secured to the center of the type bar segment. The lower end of this lever is connected by a link or rod $f^5$ to the rear end of the lever $f'$ and the upper end of the lever $f^4$ normally stands just in front of the universal bar E and extends high enough to strike the universal bar in all three positions of the shift frame and segment. The act of depressing the space bar forces the upper end of the lever $f^4$ against the universal bar and trips the escapement. The space lever $f^4$ is supported by the stationary frame A, while the universal bar is mounted on the movable frame A′, the arrangement of the parts being such that when the machine is collapsed the upper end of the space lever does not project above the plane of the upper part of the platen. The lever $f^4$ and the parts connecting it to the segment and space bar are omitted from Fig. 3, where they would naturally appear, in order not to complicate the figure and obscure other parts thereof. As indicated by the curved line $y$—$y$ Fig. 3, when the machine is collapsed the segment and rear end of the shift frame pass upwardly in front of the universal bar E without interference.

The carriage escapement comprises a toothed wheel G and a lever G′ which is connected to the upper end of the link $e^3$ whereby it is operated by the universal bar. The escapement is similar in principle to that shown in United States Patent No. 944,794, granted to me Dec. 28, 1909, but the wheel and the lever are preferably located directly in the rear of the platen and under the paper table, shown at $g$, and the escapement wheel is arranged in front of the feed pinion $g'$, with the bearing for the escapement wheel and feed pinion located between these parts, instead of outside thereof as in the patented construction. The bearing for the escapement wheel and pinion preferably consists of a shouldered sleeve $g^2$ screwed into a hole in the bracket $e^5$ and having a central rib forming a double ball race for two annular rows of balls. The escapement wheel has a conical central hole seated on the cone head of a shaft $g^3$ and is locked thereto by screwing an inner cone $g^4$ up against the wheel. The opposing cone is formed integrally with the feed pinion $g'$ and this cone and pinion are locked to the shaft by a jam nut and washer or other securing means. A bearing of any other suitable sort for the escapement wheel and feed pinion could be employed. The escapement lever G′ is preferably located over the escapement wheel and is loosely mounted on its pivot $g^5$, as shown in Figs. 11 and 16. Figs. 11 and 16 show the lever in holding position with the lever forced to the left (right as seen in Fig. 16), and as soon as the lever is released from the tooth of the escapement wheel a spring $g^6$ acts to draw the lever to the right. The object of this is to guard against the reëngagement of the lever with the same tooth of the wheel before the carriage driving spring has overcome the inertia of the carriage and started the escapement wheel, as might happen in case a very light tensioned driving spring was used.

H represents the rack bar with which the feed pinion meshes. The rack bar is made of a rectangular bar of substantially the length of the carriage with the rack teeth projecting downwardly from the forward portion of its lower edge. The front and rear faces of the bar are provided with opposable slots for the reception of the margin and tabulator stops hereafter described. The ends of the rack bar are secured to the rear ends of supporting levers $h$ and $h'$ which are pivotally mounted on the opposite ends of the carriage. These levers preferably have inwardly extending rear ends which are riveted in slots at the end of the rack bar. The levers $h$ and $h'$ are pivoted by screws $h^2$ or otherwise to the ends of the carriage and are provided with slots $h^3$ concentric with their pivots in which screws or pins $h^4$, attached to the ends of the carriage, extend to limit the up and down movements of the rack bar. The forward end of the lever $h$ extends under the adjacent end of the platen shaft and upwardly and outwardly in front thereof in position to be engaged and actuated by the line space lever, presently described. A spring $h^5$ connected to the lever $h$ and to the adjacent end of the carriage acts to yieldingly hold the rack bar in the normal position shown, in which it meshes with the feed pinion.

The line space lever preferably consists of an outer or handle portion I and an inner journal portion to which the handle portion is connected by a hinge joint $i$ which permits the handle part to be swung forwardly into the operative position shown in Fig. 5 and indicated by broken lines in Fig. 1, or to be folded inwardly in front of the platen when the machine is to be collapsed. This joint $i$ is a knuckle joint of any suitable sort which limits the outward movement of the handle part to prevent it from being swung outwardly beyond the position shown in Fig. 5 in which it is in line with the journal part. A spring $i'$ holds the handle part from accidental movement from either position. The inner part I′ of the line space lever is journaled in a forwardly extending bearing $i^2$ on the end of the carriage and is adapted to rock therein a limited distance in opposite directions. At its rear end the lever part I′ is provided with a T-head which forms inwardly and outwardly projecting arms or parts $i^3$ and $i^4$. A leaf spring $i^5$ secured at its forward end to the bearing $i^2$ rests at its free rear end on the flat top of the cross head and acts to return the line space lever to the normal position when released after being rocked in either direction. The handle part of the lever has a down-turned front end adapted to be grasped by the fingers and is provided at the upper end of this downturned portion with a projection $i^6$ which forms a rest for the thumb of the hand grasping the lever to facilitate rocking the lever. $i^7$ represents an auxiliary lever or pawl carrier which is suitably pivoted at its front end in a lug on the inside of the bearing extension $i^2$ of the end of the carriage and extends rearwardly beneath the platen shaft. A line space pawl $i^8$ is pivoted at its lower end to the rear end of the auxiliary lever and is provided at its upper end with an inwardly projecting tooth or part adapted to engage the teeth of a line space wheel $i^9$, secured to the adjacent end of the platen for turning the latter. The inwardly projecting arm $i^3$ of the line space lever overhangs and is adapted to engage an anti-friction roller $i^{10}$ suitably journaled on the auxiliary lever, so that by rocking the line space lever to the left the auxiliary lever and pawl are actuated to turn the line space wheel and platen. A concealed spring returns the auxiliary lever and pawl to their normal positions. The pawl is pressed toward the line space wheel by a concealed spring. The roller $i^{10}$ is of proper size to fill the space between the inner face of the carriage end and the line space wheel and thus prevent lateral movement of the auxiliary lever. The line space pawl is provided at its upper end with an outwardly projecting part $i^{11}$ adapted to ride over the curved rear edge of an adjusting and platen locking plate $i^{12}$ which is arranged against the inner face of the adjacent end of the carriage. This plate is made with an outwardly turned finger piece $i^{13}$ at its upper end and with a spring extension $i^{14}$, see Fig. 7, acting as a detent which is adapted to snap into either of four notches in the inner face of the end of the carriage concentric with the platen shaft. The adjusting plate is provided centrally with an outwardly projecting tubular flange which extends into an open seat in the end of the carriage and serves as a bearing for the platen shaft. The flange of the plate is open at one side to permit the platen shaft to be moved downwardly and upwardly into and out of the bearing. The adjusting plate is secured to the end of the carriage by a screw passing through a curved slot $i^{15}$, in the plate, see Fig. 8. In the position shown in Figs. 1 and 8 the plate causes the line space pawl to overrun the first tooth of the line space wheel and the pawl spring then causes the pawl to engage the line space wheel and move it two line spaces if the line space lever is moved to the limit. When at the limit of its movement a rearwardly projecting part at the upper end of the pawl strikes the inner end of the screw or stop $i^{16}$ on the end of the carriage, whereby the pawl is locked to the line space wheel and prevents further movement of either the wheel or its actuating lever. If it is desired to turn the line space wheel three spaces the adjusting plate is turned forwardly by its finger piece until the detent snaps into the next notch, and if but a single space is desired, it is turned in the opposite direction the corresponding distance. The position of the finger piece of the adjusting plate always indicates the number of spaces adjusted for and the rear edge of the adjusting plate holds the pawl out of contact with the wheel when not in action so that the platen can be turned backwardly by means of the usual finger wheel at its ends. By turning the adjusting plate rearwardly as far as it will go the pawl will be forced backwardly by the plate and the central opening in the plate will be made to register with the open seat in the end of the carriage, when the platen can be lifted out of the carriage, a similar adjusting plate $i^{17}$ at the opposite end of the carriage having been correspondingly moved. The latter plate is intended only for locking the platen in the carriage.

The outwardly projecting arm $i^4$ of the line space lever projects over the front end of the rack bar supporting lever $h$, so that by rocking the line space lever in the opposite direction the rack bar is raised out of mesh with the feed pinion and the carriage will be pulled to the left by its driving spring as far as permitted by the operator. The carriage can thus be released from the feed mechanism and moved to any desired position by means of the line space lever.

The line space wheel $i^9$ is preferably flat and loosely surrounds the platen shaft with its inner face resting against the end plate of the platen. $k$ is a short piece of tube on the platen shaft between the line space wheel and a finger wheel K on the end of the shaft. The finger wheel screws on the end of the shaft and forces the tube $k$ against the line space wheel to frictionally lock the line space wheel against the end of the platen. The tube $k$ forms a journal for this end of the platen shaft. $k'$ is a spring coiled around the platen shaft in a recess in the end of the platen and acting to press a disk $k^2$ against the line space wheel to create a slight friction between these parts. The disk has a projection seated in a notch in the end plate of the platen to hold the disk from turning and when the line space wheel is unlocked from the platen the friction between the wheel and the disk is sufficient to prevent the platen from turning except when purposely turned by means of the finger wheel. Two nuts $k^3$ with an interposed washer, screwed on the outer end of the platen shaft in a recess in the finger wheel, permit only enough backward movement of the finger wheel to unlock the line space wheel. The line space wheel is held from turning except when actuated by the line space lever, by a detent roller $k^4$, Fig. 8, which is carried by a spring secured to the end of the carriage. When the line space wheel is unlocked by unscrewing the finger wheel K the platen can be turned to any desired point by a finger wheel K′ at its opposite end. The friction between the line space wheel and the disk $k^2$ will ordinarily hold the platen against rotary movement while writing a line or part of a line, and by screwing up the finger wheel K the regular line space mechanism can be restored for use whenever desired.

L represents the ink ribbon and L′ and $L^2$ the ribbon spools. The spools are of ordinary construction and preferably of a size suitable for a full length standard ribbon one-half inch wide. The spools rest on the upper sides of inwardly extending parts $l\ l'$ of the movable frame A′ and these parts are preferably made with semicircular guards which surround the front and outer edges of the spools. The spool shafts $l^2$ are journaled in bearings on the parts $l\ l'$ of the frame and are provided with any suitable means for causing the spools to turn therewith. The ribbon passes from one spool to the other and extends through a vibrating guide or vibrator $L^3$ which is supported to reciprocate vertically in front of the central portion of the platen in any suitable manner. The ribbon is slowly wound from one spool onto the other by a feed mechanism constructed as follows:

$l^3$ represents the carriage driving spring drum, having an internal operating spring as usual. The drum is mounted under the rear cross bar of the movable frame A′ and has a scroll cam $l^{13}$ on its upper side which engages a pin $l^{14}$ depending from a reciprocating feed bar $l^4$ which is seated in a groove $l^{15}$ in the rear cross bar of the movable frame A′ under the carriage track. The feed bar is provided with forwardly extending end portions provided with spring actuated pawls $l^5$ and $l^6$ adapted to engage the downwardly facing teeth of ratchet wheels $l^7$ and $l^8$ secured to the lower ends of the ribbon spool shafts. When the carriage is drawn to the right to start a new line the cam on the spring drum forces the feed bar $l^4$ to the left and as the line is being written the cam and pin move the feed bar in the opposite direction, thus reciprocating the feed pawls $l^5$ and $l^6$. The feed pawls are controlled by a ribbon feed reversing mechanism which holds one pawl out of action, but permits the other pawl to engage and turn its ratchet wheel. One spool is thus rotated intermittently and feeds the ribbon in one direction. When the ribbon is nearly unwound from one spool the feed reversing mechanism operates to throw the active pawl out of action and place the other pawl into action to cause the ribbon to be wound on the other spool and fed in the opposite direction. The ribbon feed, feed reversing and vibrating mechanisms form the subject matter of another application about to be filed and only so much of these mechanisms is illustrated and described herein as necessary to show the location and arrangement of the ribbon operating mechanism relative to the other parts of the machine, and to show how these parts are arranged to clear or pass by parts of the machine mounted on the stationary frame A when the machine is collapsed. It will be seen that when the machine is collapsed the rear end of the shift frame is adapted to extend up in front of the universal bar and between the ribbon spool supports $l\ l'$, while the upright outwardly projecting arms of the shift frame are adapted to pass in front of the spool supports without interference. The lower front edge of the spool support $l$ is cut away slightly, as shown in Fig. 3, to clear the upper ends of the shift levers and the bracket on which they are fulcrumed.

The ribbon vibrator $L^3$, which may be of any suitable construction and guided in its vertical movement in any suitable manner, is actuated by a vibrator lever M, the lower end of the vibrator preferably having a rearward projection entering a slot in the front end of the lever, see Fig. 3. The vibrator lever is fulcrumed at its rear end in any suitable way, on the under side of the bracket $e^5$ and is connected by links $m$ and $m'$, respectively, to arms $m^2$ and $m^3$ of different lengths which are pivoted on the rock shaft $e^3$ which supports and is rocked by the universal bar E. One or the other of these arms is adapted to be connected with the rock shaft so as to be rocked thereby for vibrating the upper or lower portion of the ribbon in front of the printing point. The ribbon vibrator is thus actuated by the universal bar and is adapted to be reciprocated the proper distance for vibrating the upper or lower field of the ribbon in front of the printing point. The mechanism for changing the throw of the vibrator is not shown or described herein, as it forms a part of the invention claimed in the above mentioned application.

N and N′, Figs. 3, 5 and 14, represent two margin stops mounted on the rack bar H, and $N^2$ is a center stop or abutment against which the margin stops are adapted to strike to limit the travel of the carriage in both directions. The margin stops straddle the rack bar having legs entering the slots in the front and rear faces of the bar, whereby they are held from movement longitudinally on the bar and each stop is provided with a spring clip $n$, the free end of which is adapted to snap into notches $n'$ in the teeth on the rear side of the bar to releasably retain the stop in position. The margin stops are, as usual, adjustable to different positions on the rack bar.

The center stop $N^2$ is formed by a rearward projection on a lever $n^2$, Fig. 14, which is pivoted between its ends to the upper end of an upright lever $n^3$. The lever $n^2$ is located in a recess in the front side of the bracket $e^5$ and the stop $N^2$ projects from the lever rearwardly through a rectangular opening $n^4$ in the bracket with its rear end extending into the path of forwardly projecting portions of the margin stops. $n^5$ is a spring connected to the outer end of the lever $n^2$ and to the bracket $e^5$ and acting to yieldingly hold the center stop $N^2$ in the position shown in Fig. 14. The opening $n^4$ in the bracket permits the stop to move one letter space to the left (right in Fig. 14) after it intercepts the margin stop N, and after such movement to resist any further movement of the carriage. This movement of the stop $N^2$ swings the upper end of the upright lever $N^3$ to the left and places the lower end of the lever over the rearwardly projecting end of the arm $e^7$, connected to the universal bar, and thus locks the universal bar and escapement from action, or locks the line, as it is technically termed. By raising the rack bar until the margin stop N clears the center stop, the spring $n^5$ will move the center stop back to its normal position and then by permitting the rack bar to resume its normal position in mesh with the feed pinion, the line may be continued until the carriage reaches the end of its travel, if so desired. When the center stop $N^2$ returns to the normal position, above mentioned, it will rest under the margin stop N and as the actuating spring $h^5$ for the rack bar is stronger than the stop actuating spring $n^5$, the center stop will be depressed by the margin stop into the lower part of the opening $n^4$, but as soon as the carriage moves in either direction far enough for the margin stop to clear the center stop, the latter will return to its normal elevation. The forwardly projecting part of the margin stop N is made with an upwardly and outwardly inclined lower face, $n^6$, shown in Fig. 11, to permit it to pass over the center stop when the carriage is set back for a new line, if it has been moved to the other side of the stop. The other margin stop N′ is preferably made with a similar but oppositely inclined face, so that after this stop has been set for writing on the margin of the paper, it will not stop the carriage in its travel to the left.

O represents a main stop for tabulating, which is adapted to intercept any one of a series of stops P P′ which are adjustably placed on the rack bar, and as many of these adjustable stops may be used as desired. The traveling stops shown are provided with legs which straddle the rack bar in the notches therein and project upwardly from the rack bar. The main stop O is so located that the rack bar has to be raised about twice as far when tabulating as for simply releasing the margin stops from the center stop. This additional movement of the rack bar is made by rocking the line space lever I to a correspondingly greater distance. By rocking the line space lever the proper distance to release the rack bar from the feed pinion, the carriage can be allowed to move to the left past the first or any desired number of the tabulator stops P P′ and the selected stop then caused to engage the main stop O to stop the carriage by giving the line space lever the necessary additional movement to raise the rack bar to the limit of its upward movement; or by simply rocking the line space lever to its limit the first stop P on the rack bar will engage the main stop O. This construction thus provides for either the ordinary column stop, or selective stop systems of tabulating. It is not so rapid as a selective stop system having a series of separate keys, but it accomplishes the purpose within a space that does not admit of a series of separate stop keys, and it does not require a carriage retarding device, thereby further economizing room.

The main tabulating stop O is rigidly connected to or formed with a plate $q$ which is secured to the upper end of the bracket $e^5$ by screws $q'$, Fig. 14, passing through inclined slots in the plate. A spring $q^2$ connected to the plate $q$ and to the bracket acts to retain the stop normally in the elevated position shown. When one of the adjustable tabulating stops strikes the stop O the stop plate is moved to the left and downwardly, so that the rack bar will, when the line space lever is released, reëngage the feed pinion before the adjustable stop is disengaged from the main stop O. This permits the line space lever to be released as soon as the adjustable stop strike the stop O without danger of further movement of the carriage.

$q^3$ represents a bell crank lever which is pivotally mounted on the rear side of the bracket $e^5$, see Fig. 14, and has an upper arm provided with a roller adapted to travel on the under side of the rack bar in rear of the rack teeth, when the rack bar is in its normal feeding position. When the rack bar is raised to release the carriage a concealed spring swings the bell crank lever upwardly and a tooth on its lower arm enters between two adjacent teeth of the feed pinion and locks the pinion and carriage escapement from movement, so that when the rack bar is released it will properly engage the feed pinion.

R represents the auxiliary carriage release lever which is pivoted on the left hand end of the carriage and is adapted to engage the rack supporting lever $h'$ for lifting the rack to permit either margin stop to pass the center stop. A pin $r$, Fig. 10, limits the downward movement of the auxiliary release lever, so that the rack cannot be raised by this lever high enough to cause the adjustable stops P P′ to engage the tabulating stop O. The auxiliary release lever will ordinarily be used to release the carriage or line lock, and the line spacing lever I will be used for tabulating.

S represents a carriage back setting lever. This lever, see Figs. 5 and 11, is pivoted between its ends to a lug on the under side of the rear cross bar of the movable frame A′ and its rear end projects loosely into a hole in one end of a bell crank lever $s$, Fig. 14, which is suitably pivoted on the rear portion of the frame A′. A spring $s^2$ around the pivot bearing for this lever acts to yieldingly hold the back setting lever and connected parts in the normal position. $s^3$ is a bar which is pivoted to the upper end of the lever $s$ and is provided with a slot $s^4$ near its opposite end through which extends a screw $s^5$ which is seated in an upright bracket $s^6$ rigidly secured at its lower end to the rear cross bar of the frame A′. The bar $s^3$ is adapted to slide on the screw $s^5$. The bracket $s^6$ is provided with a lateral extension formed with an inclined face, as shown in Fig. 5, adapted to force the inclined end of the bar $s^3$ forwardly when the bar is moved inwardly by actuating the back setting lever. $s^8$ is a slide arranged on the bar $s^3$ and retained thereon by the screw $s^5$ and a screw $s^9$ which passes through a slot $s^{19}$ in the slide into the bar $s^3$. The slide $s^8$ has a forwardly extending tooth at its inner end adapted to enter any one of the stop slots in the rear face of the rack bar H below the lower ends of the margin stops. A spring $s^{10}$ connecting the slide $s^8$ to the bar $s^3$ acts normally to hold the inner end of the short slot $s^{11}$ in the slide against the screw $s^5$, as indicated in Fig. 11. A leaf spring $s^{12}$ secured to the bracket $s^6$ and bearing at its free upper end against the front side of the slide $s^8$ tends to move the slide rearwardly to disengage its tooth from the rack bar. Bearing in mind that the screw $s^5$ is stationary and that the other screw $s^9$ moves with the bar $s^3$ the action of this device is as follows: The initial depression of the back setting lever moves the inclined inner end of the bar $s^3$ against the inclined face of the bracket $s^6$ and forces the tooth on the slide $s^8$ into the slot of the rack bar which registers therewith, and the continued movement of the back setting lever S, the screw $s^9$ being then located at the inner end of the long slot $s^{19}$ in the slide, carries the rack bar and carriage along until both the slide $s^8$ and the bar $s^3$ are stopped by the screws $s^5$. The slots limit the movement of the carriage to about one-half letter spaces, and as soon as this movement takes place the escapement lever G′ secures the escapement wheel one tooth backward from its former position. As the tooth on the slide $s^8$ is straight with a rounded end, it is locked to the rack bar so that it positively prevents the bar from further movement. As soon as the back setting lever S is released the spring $s^2$ acts to restore the lever and the bar $s^3$ to their normal positions, and during the first part of this return movement the spring $s^{12}$ pressing rearwardly on the slide $s^8$ withdraws the tooth from engagement with the rack bar, and as soon as the tooth is clear from the rack bar the spring $s^{10}$ restores the slide to its normal position. The back setting lever may be actuated as rapidly as desired and effects a single space backward movement of the carriage, and only one space movement, for each depression of the lever.

T represents the center guide for the type bars, this is preferably a sheet metal stamping having forwardly turned guide portions at its upper end between which the type bars are guided to the printing point. It is fixed rigidly to a lug extending forwardly from the rear cross bar of the movable frame A′ and with the latter forms a guide for the ribbon vibrator $L^3$. The type heads are made of uniform width to fit the guide at three points, between and inwardly beyond the three type or characters, so as to provide proper bearings for the type bars in the guide in the several printing positions of the segment.

The described collapsible construction of the machine is such that when collapsed the machine is very thin or narrow in one direction. This is very desirable since it enables the machine to be contained in a narrow case which can be carried and handled much more conveniently than a wider or thicker case, even of smaller dimensions in other respects.

In the application the various devices and parts necessary to make a complete typewriting machine capable of performing all of the functions of the modern typewriter have been illustrated and described, in order to show how all of these devices or parts can be arranged and coöperate in a collapsible machine, and the preferred construction of the various parts has been shown and described. It is not, however, thereby intended to restrict the invention to a machine equipped with all of these parts or devices, nor to the particular construction thereof specified. The claims for the relative arrangement of the various parts, whereby the machine can be collapsed into smaller compass, are not intended to be restricted to the described construction of the individual parts. On the other hand, the claims, made for the specific constructions of certain of the parts, are not necessarily limited to the use of these constructions in a collapsible machine. Novel constructions for various parts of the machine, such for instance as key actions, the universal bar arrangement, the line spacing mechanism, the carriage escapement, the ribbon feeding and vibrating mechanisms, the anti-friction carriage guide track, the tabulating mechanism, the carriage back setting mechanism and the line locking mechanism have been described and shown in detail without making specific claims therefor. But, the right is reserved to claim these various features in appropriate divisional applications.

It will be observed that one of the important features of this machine is that during the act of compacting as well as the act of extending the machine the operating elements carried by the movable member are not inverted or otherwise indirectly moved, but on the contrary are at all times maintained in their operative or upright positions; that is to say, while the elements on each frame member are out of coöperative position with the elements of the other group when the machine is compacted, the elements of both groups are maintained in operative or non-inverted position.

I claim as my invention:

1. In a typewriting machine, the combination with a series of upwardly and rearwardly movable type bars, a platen, and a carriage therefor, of a stationary frame on which the type bars are mounted, a support for the carriage which is mounted on the stationary frame to move in a substantially upright position substantially directly downward to lower the carriage while retaining it upright from an elevated operative position to an inoperative position materially below its operative position.

2. In a typewriting machine, the combination with a series of upwardly and rearwardly movable type bars each having a plurality of type, a platen, a carriage therefor, and means for shifting the type bars relative to the platen for printing different case characters, of a stationary frame on which the type bars are mounted, a support by which the carriage is normally supported in a relatively fixed elevated operative position and which is mounted on the stationary frame to move downwardly in a substantially upright position with the carriage upright thereon to lower the carriage to an inoperative position materially below its operative position for collapsing the machine to smaller dimensions.

3. In a typewriting machine, the combination with printing instrumentalities, a platen, and a carriage therefor, of a stationary frame supporting the printing instrumentalities, a support by which the carriage is normally supported in an elevated operative position above and in rear of the printing instrumentalities and which is mounted on the stationary frame to move downwardly while retaining the carriage substantially upright to lower the carriage from its operative position to an inoperative position in rear of the printing instrumentalities for collapsing the machine to smaller dimensions.

4. In a typewriting machine, the combination with printing instrumentalities, a platen, and a carriage therefor, of a stationary frame supporting the printing instrumentalities, a support by which the carriage is normally supported at an elevation above the printing instrumentalities and which is mounted on the stationary frame to move substantially directly downward while retaining the carriage substantially upright to a position to place the carriage in an inoperative position at substantially the same elevation as the printing instrumentalities.

5. In a typewriting machine, the combination with printing instrumentalities, a platen, and a carriage therefor, of a stationary frame on which said printing instrumentalities are shiftably mounted for printing different case characters; and a frame which supports said carriage and is movable relative to said other frame to support the platen in an operative position above said printing instrumentalities and to lower the carriage while retaining it upright to an inoperative position in rear of said printing instrumentalties, substantially as set forth.

6. In a typewriting machine, the combination with printing instrumentalities, a platen and a carriage therefor, of a stationary frame on which said printing instrumentalities are mounted, means for shifting said printing instrumentalities for printing different case characters, and a frame which is pivoted to the stationary frame and is normally held stationary to support the carriage in an elevated operative position but is movable to lower the carriage to an inoperative position in rear of the printing instrumentalities, substantially as set forth.

7. In a typewriting machine, the combination with printing instrumentalities, a platen, and a carriage therefor, of a stationary frame on which said printing instrumentalities are mounted, and a carriage supporting frame which is pivoted to the front portion of said stationary frame and is movable to support the carriage in an elevated operative position and to lower said carriage to an inoperative position, substantially as set forth.

8. In a typewriting machine, the combination with type bars, key actuating mechanism therefor, a platen and a carriage for the platen, of a stationary frame on which said type bars and their key actuating mechanism are mounted, and a carriage supporting frame which is movably connected to said stationary frame and is movable substantially directly up and down in substantially upright position to support the carriage in an elevated operative position and to lower the carriage while retaining it upright to a position in rear of said type bars, substantially as set forth.

9. In a typewriting machine, the combination with type bars, key actuating mechanism therefor, a platen and a platen carriage, of a frame on which said key actuating mechanism is mounted, and a carriage supporting frame which is movable substantially directly up and down in substantially upright position to support the carriage in an elevated operative position and to lower the carriage while retaining it upright to an inoperative position in rear of said key actuating mechanism, substantially as set forth.

10. In a typewriting machine, a two part frame, one of which parts surrounds and is movable up and down relative to the other, and a platen which is supported by said movable frame part and is movable therewith from an elevated operative position to a lower inoperative position, substantially as set forth.

11. In a typewriting machine, a frame comprising a stationary part and a movable part which is connected at its front portion to said stationary part, and a platen which is mounted on the rear portion of said movable part, the rear portion of said movable frame part being movable up and down to support the platen in an elevated operative position and in a lower inoperative position, substantially as set forth.

12. In a typewriting machine, a frame comprising a stationary part and a movable part which is pivoted at its front portion to said stationary part, the rear portion of said movable frame part being movable up and down, and said movable frame part being adapted to surround said stationary part when lowered, and a platen which is supported by the rear portion of said movable frame part, substantially as set forth.

13. In a typewriting machine, a frame comprising two substantially rectangular parts, one of which is pivotally connected at its front portion to the other and is movable up and down relative thereto and is adapted to surround the other frame part when lowered, a platen and a carriage therefor mounted on said movable part, and printing instrumentalities mounted on said other frame part, substantially as set forth.

14. In a typewriting machine, a frame comprising a stationary part and a part which is mounted to move up and down on said stationary part, a platen, and a carriage therefor which are mounted on and movable with said movable frame part while being retained in substantially upright position to and from an elevated operative position for placing the carriage in position for use and for collapsing the machine, and means for rigidly locking said movable frame part from movement with the carriage in its operative position.

15. In a typewriting machine, the combination of a stationary frame and an adjustable normally stationary frame which is adjustable up and down on said stationary frame, type bars and actuating mechanism therefor mounted on said stationary frame, a platen carriage mounted on and movable with said adjustable frame part while being retained substantially upright from an operative relation to the type bars to a lower inoperative relation, a universal bar which is mounted on said adjustable frame and moves therewith into and out of operative relation to the type bars, and means operatively connected with and actuated by the universal bar.

16. In a typewriting machine, the combination of a stationary frame and an adjustable normally stationary frame which is adjustable up and down on said stationary frame, type bars and actuating mechanism therefor mounted on said stationary frame, a platen carriage mounted on and movable with said adjustable frame part while being retained substantially upright from an operative relation to the type bars to a lower inoperative relation, means for shifting the type bars for printing different case characters, a universal bar which is mounted on said adjustable frame and moves therewith into and out of operative relation to the type bars, and means operatively connected with and actuated by the universal bar.

17. In a typewriting machine, the combination of a stationary frame and an adjustable normally stationary frame which is adjustable up and down on said stationary frame, type bars and actuating mechanism therefor mounted on said stationary frame, a platen carriage mounted on and movable with said adjustable frame part while being retained substantially upright from an operative relation to the type bars to a lower inoperative relation, a universal bar which is normally supported in position to be actuated by the type bars and is movable downwardly with said adjustable frame to an inoperative position in rear of the type bars, and means operatively connected with and actuated by the universal bar.

18. In a typewriting machine, the combination of a stationary frame and an adjustable normally stationary frame which is adjustable up and down on said stationary frame, type bars and actuating mechanism therefor mounted on said stationary frame, a platen carriage mounted on and movable with said adjustable frame part while being retained substantially upright from an operative relation to the type bars to a lower inoperative relation, means for shifting the type bars for printing different case characters, a universal bar which is normally supported in position to be actuated by the type bars in the different case printing positions thereof and is movable downwardly with said adjustable frame to an inoperative relation to the type bars, and means operatively connected with and actuated by the universal bar.

19. In a typewriting machine, the combination of a two part frame comprising parts pivotally connected at the front end of the machine, one of said parts being stationary and the other movable thereon in a substantially upright arc, a segment supporting a series of type bars mounted on said stationary frame part, and a pair of ribbon spools mounted on the movable frame part in position to pass directly downward beside the type bars at the ends of the segment when the movable frame part is lowered, substantially as set forth.

20. In a typewriting machine, the combination of a two part frame comprising a stationary part and a movable part which are pivotally connected at their front ends, the rear end of said movable part being movable up and down relative to said stationary part, type bars and actuating mechanism therefor mounted on said stationary frame part, a platen carriage mounted on said movable frame part and movable therewith while being retained in substantially upright position from an elevated operative position substantially directly downward to a position in rear of said type bars, and ribbon spools supported by said movable frame part in front of said carriage and at opposite sides of said type bars, substantially as set forth.

21. In a typewriting machine, the combination of a two part frame comprising a stationary part and a movable part which is movably mounted on said stationary part, type bars and actuating mechanism therefor mounted on said stationary frame part, a platen carriage and ribbon spools and a ribbon vibrator mounted on and movable with said movable frame part, said carriage and ribbon vibrator being movable while being retained substantially upright, to positions in rear of said type bars and said ribbon spools being movable to position at opposite sides of said type bars when said movable frame part is lowered, substantially as set forth.

22. In a typewriting machine, the combination of a two part frame comprising a stationary part and a movable part which are pivotally connected at their front ends, type bars mounted on said stationary frame part, a paper carriage and a ribbon vibrator arranged on said movable frame part to move up and down therewith in rear of said type bars while being retained in substantially upright position, and ribbon spools arranged on said movable frame part to move up and down therewith at opposite sides of said type bars, substantially as set forth.

23. In a typewriting machine, the combination of a two part frame comprising a stationary part and a movable part which are pivotally connected at their front ends, said movable part being movable substantially directly up and down on said stationary frame part, and a paper carriage and ribbon feed mechanism arranged on said movable frame part to move up and down therewith in rear of said type bars while being retained in substantially upright position, substantially as set forth.

24. In a typewriting machine, the combination of a frame comprising a stationary part and a part which is pivotally mounted directly on said stationary part, type bars mounted on said stationary frame part, and a paper carriage and carriage escapement including a universal bar arranged on said pivotally mounted frame part and movable therewith from an elevated operative position to a lower inoperative position relative to said type bars, substantially as set forth.

25. In a typewriting machine, the combination of a frame comprising a stationary part and a movable part pivotally connected at their front ends, type bars mounted on said stationary frame part, and a paper carriage and universal bar mechanism arranged on said movable frame part to move up and down therewith relative to said stationary frame part and said type bars while being retained in substantially upright position, substantially as set forth.

26. In a typewriting machine, the combination of a frame comprising a stationary part and a movable part, a platen and platen carriage mounted on said movable frame part and movable therewith from an operative to an inoperative position, and means for rotating said platen including a jointed line space lever having a part which is movable from an operative position to a position at a lower elevation, substantially as set forth.

27. In a typewriting machine, the combination of a frame comprising a stationary part and a movable part, a keyboard on said stationary frame part, a platen carriage supported by said movable frame part and movable therewith from an operative to an inoperative position, and a jointed line space lever for the platen normally extending forwardly from the carriage toward the keyboard and having a front portion adapted to fold backwardly toward the carriage to a position at a lower elevation, substantially as set forth.

28. In a typewriting machine, the combination of a frame comprising a stationary part and a part which is movable up and down on said stationary part, a platen carriage supported by said movable frame part and movable therewith from an operative to an inoperative position, and spring supporting means for said movable frame part, substantially as set forth.

29. In a typewriting machine, the combination of a frame comprising a stationary part and a movable part, type bars mounted on said stationary part, a platen carriage supported by said movable frame part and movable therewith from an operative to an inoperative position relative to said type bars, a spring acting to raise and support the movable frame part, and means for locking said movable frame part in its elevated position, substantially as set forth.

30. In a typewriting machine, the combination of a frame comprising a stationary part and a movable part, type bars and a space key mounted on said stationary frame part, a platen carriage and carriage escapement including a universal bar mounted on said movable frame part and movable therewith from an operative to an inoperative position relative to said type bars, and connections between said space key and said universal bar which permit the movement of said carriage to said inoperative position, substantially as set forth.

31. In a typewriting machine, the combination of a frame comprising a stationary part and a movable part which is movable on said stationary part substantially directly downward from an elevated to a lower position, a keyboard arranged in banks on said stationary frame part, and a platen carriage which is supported by said movable frame part and is movable therewith while being retained in substantially upright position from an operative position at an elevation above the upper bank of keys to an inoperative position at a lower elevation in rear of said keyboard.

32. In a typewriting machine, a two part frame, comprising a stationary part, and a movable part mounted thereon, a segment supporting a series of type bars mounted on the stationary part, a universal bar mounted on the movable frame part in position to be struck by the type bars and adapted to pass downward in rear of the type bar segment when the movable frame part is lowered to inoperative position.

33. In a typewriting machine, the combination with printing instrumentalities, and a platen, of supports for said printing instrumentalities and for said platen, the latter of which is movable for collapsing the machine, the part that supports the printing instrumentalities occupying a position within the other part when the machine is collapsed.

34. In a typewriting machine, the combination of a two part frame one of which parts is stationary and the other movable thereon for moving the platen to and from an operative position, a series of upwardly and rearwardly swinging type bars each having a plurality of type mounted on the stationary frame part and shiftable thereon, a platen mounted on the movable frame part, and a universal bar in fixed relation with the platen that is adapted to intercept the type bars at different points between their ends when the type bars are in different positions.

35. In a typewriting machine, a two part frame comprising a stationary part and a movable part pivotally connected at their front ends, a series of type bars arranged on the stationary frame part to swing upwardly and rearwardly, a platen and a carriage arranged on the movable frame part to travel transversely thereon, and to drop down in rear of the type bars while being retained in substantially upright position when the movable frame part is moved on its pivot.

36. In a typewriting machine, a rigid stationary frame, and a rigid movable frame pivotally mounted thereon, and supported thereby, a segment having a series of type bars arranged on the stationary frame part to swing upwardly and rearwardly, and a transversely movable platen and carriage mounted on the movable frame part, the plane of the segment being inclined to the rear to permit the carriage to swing downwardly from its operative position to an inoperative position in rear of the segment.

37. In a typewriting machine, the combination of a two-part main frame, each comprising a pair of parallel side plates and a connecting bar, and arranged with the side plates of one part to overlap the side plates of the other part, and said parts being always maintained in an upright position.

38. In a typewriting machine, the combination of a two-part main frame, a space key arranged on one part, and a universal bar on the other part of said frame, and operative connections between the space key and the universal bar arranged to permit the universal bar to be moved downwardly while maintaining its upright position without interference.

39. In a typewriting machine, the combination of a two-part main frame having one part movable relatively to the other, a platen carriage, escapement mechanism, ribbon mechanism including means for vibrating a ribbon and for feeding the same lengthwise, and a universal bar all mounted upon one part of the frame, a keyboard mounted upon another part of the frame, and type adapted to be moved toward the platen carriage as each key is depressed.

40. In a typewriting machine, the combination of a main frame having relatively movable parts adapted to move one within the other to reduce the cubical dimensions of the machine in one position thereof, a platen carriage, escapement mechanism, ribbon instrumentalities, and a universal bar all mounted upon one part of said frame, and a keyboard mounted on another part of said main frame, said keyboard, carriage, escapement mechanism, ribbon instrumentalities all maintaining upright position while in a normal operative position and while the parts are moved relatively to make the machine compact.

41. In a typewriting machine, the combination of a two part main frame, each part comprising a pair of parallel side plates and a connecting bar, and arranged with the side plates of one part to overlap the side plates of the other part keys and printing instrumentalities carried by one of said parts, a platen carriage carried by the other of said parts, and means to permit said parts to have a relative up and down movement to reduce the height of the machine when not in use.

42. In a typewriting machine, the combination of two main frame parts each comprising a pair of parallel side plates and a connecting bar, means for pivoting together the side plates near the front of the machine, keys, and printing instrumentalities carried by one part, a platen carriage carried by the other part in the rear of the printing instrumentalities, whereby the frame parts may have a relative up and down swinging movement to place the platen carriage at the rear of the printing instrumentalities when the machine is in its inoperative position.

43. In a typewriting machine, the combination of a two-part support having one part movable relatively to the other, a platen carriage escapement mechanism, ribbon mechanism, including means for vibrating a ribbon and for feeding the same lengthwise, and a universal bar, all mounted upon one part of the support, a keyboard mounted upon the other part of the support, and type adapted to be moved toward the platen carriage as the keys are depressed.

44. In a typewriting machine, keys, a type bar for each key, a carriage, and means for supporting said carriage at a higher level than the type bars, said means permitting the carriage to move directly downwardly in the rear of type bars.

45. In a typewriting machine, the combination of a two-part support having one part movable relatively to the other, a platen carriage, an escapement mechanism, and a universal bar all mounted upon one part of the support, a keyboard mounted upon the other part of the support, and type adapted to be moved toward the platen carriage as the keys are depressed.

46. A compactible typewriting machine, embodying two supporting-members, one carrying the platen and its associated devices and the other the keys, type bars operable by the keys, said supporting members being so connected as to be relatively movable to thereby compact or extend the machine by bringing the platen and its associated devices closer to or farther from the keys, the two supporting members maintaining the operative elements in their upright positions during the act of compacting as well as extending the machine.

47. A compactible typewriting machine, embodying two supporting members, one carrying the platen and its associated devices and the other the keys and the type bars operable by the keys, said supporting members being so connected as to be relatively movable to thereby compact or extend the machine by bringing the platen and its associated devices closer to or farther from the keys and type bars, the two supporting members maintaining the upright elements in their operative positions during the act of compacting as well as extending the machine.

48. In a compactible typewriting machine, the combination of a two-part support, one part carrying the platen and its associated devices and the other part the keys and type bars, one of said support parts being movable into the other to thereby reduce the outside dimensions of the machine when compacted, the construction and arrangement of the devices on each support part being such that in thus moving the support parts into and out of each other the groups of devices carried by each support part maintain their operative positions.

49. A compactible typewriting machine embodying two supporting members, one carrying the platen and its associated devices and the other the keys, type bars operable by the keys, the upper one of said supporting members being so connected as to be vertically movable with respect to the lower supporting member to thereby compact or extend the machine by bringing the platen and its associated devices closer to or farther from the keys, the two supporting members maintaining the operative elements in their upright positions during the act of compacting as well as extending the machine.

50. In a typewriting machine, the combination of a two part supporting frame, each of said parts comprising a pair of parallel side plates and a connecting bar, and means for locking the side plates of one frame part to the side plates of the other frame part to form a rigid rectangular frame, substantially as set forth.

51. In a typewriting machine, the combination of type-carriers, a keyboard therefor, a platen, and means which enable the machine to be contracted into a smaller space than that which it occupies when in use, said means comprising a frame having relatively movable sections carrying the working parts of the machine, said sections being adapted to fit one within the other, and means which enable the type-carriers and platen to be adjusted bodily relatively one to the other into and out of coöperative relation.

52. In a collapsible typewriting machine, the combination of a base frame, upwardly and rearwardly movable type bars supported on said base frame, a key action for actuating the type bars, ribbon spools, mechanism for rotating the spools including means adapted to be engaged and actuated by the type bars, means for supporting the spools and spool-rotating mechanism in an elevated operative position relatively to the type bars when the machine is in its normal operative position, said means being shiftable to move the spools and spool-rotating means downwardly while upright to a lower inoperative position relatively to the type bars.

53. In a collapsible typewriting machine, the combination of type bars, a key action for operating the type bars, a ribbon vibrator, ribbon feeding mechanism, means operable by the type bars for actuating the ribbon vibrator and ribbon feeding mechanism, and means whereby the ribbon vibrator and ribbon feeding mechanism together with the actuating means therefor may be shifted bodily relatively to the type bars while upright from an operative position to a more compact inoperative position.

54. In a visible typewriting machine, the combination of upwardly moving type bars, keys operatively connected to the type bars, a platen carriage movable out of the path of the type bars into compact relation to another part of the machine at the rear of the type bars while maintained in an upright position, and ribbon mechanism adapted to be operated by the type bars on the depression of the keys and movable out of the path of the type bars and partaking of the compact movement of the platen carriage.

55. In a collapsible typewriting machine, the combination of type bars, a key action, ribbon vibrating means operable by the type bars when the machine is in its normal extended operative position, and means for shifting the ribbon vibrating means while upright to a compact position out of coöperative relation with the type bars when the machine is collapsed.

56. In a collapsible typewriting machine, the combination of type bars, a key action for operating the type bars, a platen carriage, ribbon mechanism operable by the type bars when the machine is in its normal extended position, and means for shifting the ribbon mechanism and platen carriage while upright to a compact position out of coöperative relation with the type bars when the machine is collapsed.

57. In a collapsible typewriting machine, the combination of a base frame, a key action, type bars mounted on the base frame, a support movable relatively to the base frame to reduce the height of the machine, connections between said support and frame for maintaining the support in an upright position at all times, a platen carriage mounted on the support, and ribbon mechanism operable by the type bars, said ribbon mechanism and platen carriage being maintained in coöperative relation and in an upright position at all times and being movable bodily with the support into and out of coöperative relation with the type bars.

58. In a visible typewriting machine, the combination of a support, upwardly and rearward moving type-bars, key-operated levers connected to operate the type-bars, both type bars and levers being mounted on the support, there being one type bar for each key, a second support, connections between said supports whereby the second support may be moved up and down while in an upright position, a carriage adapted to travel along the second support and movable therewith out of the path of the type bars while maintained in an upright position into compact relation to another part of the machine while not in use, and ribbon mechanism mounted on the second support and adapted to be operated by the type bars and completely separated therefrom at all times, said ribbon mechanism partaking of the compact movement of the carriage and including means for vibrating a ribbon and for feeding the same lengthwise.

59. In a visible typewriting machine, the combination of pivotally held type bars, key-operated levers connected to operate the type bars, there being one type bar for each key, a support movable while upright relatively to the type bars, a carriage adapted to travel along the support and movable therewith out of the path of the type bars while maintained in an upright position into compact relation to another part of the machine at the rear of the type bar pivoting means while not in use, and ribbon mechanism mounted on the carriage support and adapted to be operated by the type bars and completely separated therefrom at all times, said ribbon mechanism partaking of the compact movement of the carriage and support and including means for vibrating a ribbon and for feeding the same lengthwise.

60. In a collapsible typewriting machine, the combination of a base, a key action, a type segment supported on the base, upwardly and rearwardly movable type bars held to the type segment, a movable support, connections between the base and support whereby the support may be moved downwardly while upright to reduce the height of the machine, a platen carriage mounted on said support, ribbon spools and a ribbon vibrator supported in coöperative relation with the platen carriage, means mounted on said support and operable by the type bars for operating the ribbon vibrator and spools, said vibrator and the operating means for the vibrator and spools being movable with the platen carriage to a compact position at the rear of the type segment and said spools being movable to a lower position at opposite sides of the type segment when the support is moved downwardly to collapse the machine.

61. In a visible typewriting machine, the combination of type bars, a support for the type bars, a second support pivotally held adjacent its forward end to the type bar support, a platen carriage mounted on said second support at the rear thereof and movable from an elevated position in a substantially vertical direction to a more compact lower position at the rear of said type bars while maintained in an upright position, and ribbon mechanism operated by the type bars and completely separable therefrom and partaking of the compact movement of said platen carriage.

62. In a visible typewriting machine, the combination of type bars, a support for the type bars, a second support, a platen carriage having an up-and-down movement with said support from an elevated position to a lower and more compact position while maintained in an upright position, keys operatively connected to the type bars, a universal bar mounted on the carriage support, a ribbon vibrator operatively connected to the universal bar also mounted on said carriage support, and ribbon spools and means for rotating said spools also mounted on the carriage support, said vibrator, universal bar and ribbon feed means partaking of the compact movement of the carriage.

63. In a collapsible typewriting machine, the combination of a base frame, upwardly and rearwardly movable type bars, a key action for actuating the type bars, a movable support, connections between said support and frame whereby said support may be moved downwardly while upright from a normal elevated position to a lower position to collapse the machine, a platen carriage mounted on said support, ribbon mechanism supported in coöperative relation with the platen carriage, and a universal bar operatively connected to actuate the ribbon mechanism and mounted on said support in position to be operated by the type bars, said platen carriage and universal bar being movable out of the path of the type bars to a lower position at the rear of the type bars when the machine is collapsed and said carriage and ribbon mechanism being maintained in coöperative relation and in an upright position at all times.

64. In a visible typewriting machine, the combination of a main frame having pivotally held and relatively movable parts to reduce the dimensions thereof when moved from a normal operative elevated position to an abnormal lower position while maintained in an upright position, a platen carriage, ribbon vibrating mechanism, and means for feeding the ribbon lengthwise, all mounted upon one member of the main frame, keys mounted upon another part of the frame, type bars operated by the keys and adapted to actuate the ribbon vibrating mechanism, said ribbon vibrating mechanism and lengthwise feeding mechanism being entirely independent of and separated at a distance from the type bars to adapt said vibrating mechanism and the lengthwise ribbon feed to be moved from a normal operative position to an inoperative position while all the parts are maintained in their upright position.

65. In a visible typewriting machine, the combination of a two-part main frame, ribbon vibrating mechanism mounted on one part and key-levers mounted on the other frame part, a universal bar adapted to be operated as the key-levers are actuated and operatively connected to move the vibrator and mounted on the same part of the frame as said ribbon vibrating mechanism, said key-levers and universal bar being adapted to move relatively to place the key-levers out of operative relation to the universal bar and make the machine compact while not in use.

66. In a collapsible typewriting machine, the combination of a frame comprising a stationary member and a movable member connected adjacent their forward ends and having a relative vertical movement at their rear ends, a type segment supported on the stationary member, type bars having an upward and rearward movement supported in the type segment, a key action for actuating the type bars, a platen carriage supported on the movable member in the rear of the plane of the type segment, ribbon spools supported on the movable member at opposite sides of the type segment, and means supported on the movable member for operating the ribbon spools and movable with the platen carriage to a point in rear of the type segment when the movable member is lowered to collapse the machine.

67. In a collapsible tyepwriting machine, the combination of a frame comprising a stationary member and a movable member connected adjacent their forward ends and having a relative vertical movement at their rear ends, a type segment supported on the stationary member, type bars having an upward and rearward movement supported in the type segment, a key action for actuating the type bars, a platen carriage supported on the movable member in the rear of the plane of the type segment, ribbon spools supported on the movable member at opposite sides of the type segment, means supported on the movable member for vibrating a ribbon to and from the printing point, and means supported on the movable member for rotating the ribbon spools, said ribbon vibrating means and spool rotating means being movable with the platen carriage to a point in rear of the type segment when the movable member is lowered to collapse the machine.

68. In a collapsible typewriting machine, the combination of a frame comprising a stationary member and a movable member connected adjacent their forward ends and having a relative vertical movement at their rear ends, a type segment supported on the stationary member, type bars having an upward and rearward movement supported in the type segment, a key action for actuating the type bars, a platen carriage supported on the movable member in the rear of the plane of the type segment, ribbon spools supported on the movable member at opposite sides of the type segment, a ribbon vibrator supported on the movable member, a universal bar supported on the movable member and adapted to be actuated by the type bars when the movable member is in elevated position, connections between the universal bar and ribbon vibrator for actuating the vibrator, and means supported on the movable member for operating the ribbon spools, said ribbon vibrating means, spool-operating means, and universal bar being movable to a point in rear of the type segment when the movable frame is lowered to collapse the machine.

69. In a typewriting machine, the combination of a frame comprising a stationary base member, a movable support at the rear of the base member, connections between said support and the base member whereby said support may be moved downwardly at the rear of the type bars while upright from a normal elevated position to a lower position to make the machine more compact, a type segment supported in the stationary base member, type bars, a key action for actuating the type bars, a platen carriage supported on the movable support, ribbon spools supported on the movable support at opposite ends thereof to move downwardly at the sides of the machine, and means on the movable support for operating the ribbon spools and movable with the platen carriage to a point in rear of the type segment when the movable support is lowered to collapse the machine.

70. In a typewriting machine, the combination of a frame comprising a stationary base member, a movable support at the rear of the base member, connections between said support and the base member whereby said support may be moved downwardly at the rear of the type bars while upright from a normal elevated position to a lower position to make the machine more compact, a type segment supported in the stationary base member, type bars, a key action for actuating the type bars, a platen carriage supported on the movable support, ribbon spools supported on the movable support at opposite ends thereof to move downwardly at the sides of the machine, means supported on the movable support for vibrating a ribbon to and from the printing point, and means on the movable support for operating the ribbon spools, said ribbon vibrating means and said spool operating means being movable with the platen carriage to a point in rear of the type segment when the movable support is lowered to collapse the machine.

71. In a visible typewriting machine, the combination of a keyboard, type bars each operated by individual keys of the keyboard, a platen carriage movable from a normal operative position to a more compact and inoperative position with relation to the type bars, an escapement mechanism for said carriage partaking bodily of the compact movement of the carriage, and a universal bar operatively connected to the escapement mechanism and mounted to partake of the compact movement of the carriage.

72. In a typewriting machine, the combination of a keyboard, type bars each operated by individual keys of the keyboard, a platen carriage movable while upright from a normal operative position to a more compact position at the rear of the type bars, an escapement mechanism for said carriage partaking of the compact movement of the carriage, and a universal bar operatively connected to the escapement mechanism and also mounted to partake of the compact movement of the carriage.

73. In a typewriting machine, the combination of a base frame part, a key action and type bars mounted on the base frame part, a movable frame part pivotally held adjacent its front end to the base frame part, a platen carriage supported at the rear of the movable frame part and movable therewith while upright from a normal elevated operative position with relation to the type bars to a more compact inoperative position at the rear of the type bars, an escapement mechanism for said carriage mounted upon the movable frame part, and a universal bar mounted on the movable frame part and operatively connected with the escapement mechanism, said universal bar being normally supported in position to be actuated by the type bars during the printing movement thereof, and being movable with the carriage from its normal operative position to a lower inoperative position at the rear of the type bars.

74. In a visible typewriting machine, the combination of a base frame part, a movable frame part pivotally held adjacent its forward end to the base frame part, key-operated levers mounted on the base frame part, upwardly and rearwardly movable type bars mounted on the base frame part and operatively connected to the key-operated levers, a platen carriage mounted at the rear of the movable frame part and movable from a normal elevated operative position downwardly to a more compact inoperative position at the rear of the type bars, an escapement mechanism mounted on the movable frame part, a universal bar operatively connected to actuate the escapement mechanism and adapted when in its normal operative position to be engaged by the type bars during the printing movement thereof, said escapement mechanism and universal bar being movable with the platen carriage from their normal operative positions downwardly to a more compact inoperative position at the rear of the type bars.

75. In a visible typewriting machine, the combination of a frame, a key action and type bars mounted on the frame, a platen carriage, a foldable support for the platen carriage held to the frame, an escapement mechanism mounted at the rear of the carriage on said foldable support, a universal bar mounted on said support and adapted to be engaged by the type bars during the printing movement thereof, said escapement mechanism and universal bar being operatively connected at all times and being foldable with the platen carriage from a normal elevated operative position downwardly to a more compact inoperative position at the rear of the type bars.

76. In a visible typewriting machine, the combination of a universal keyboard, a type segment, upwardly and rearwardly movable type bars mounted in said segment and operatively connected with individual keys forming a part of the keyboard, a platen carriage, a foldable support for the platen carriage, an escapement mechanism for the carriage mounted on said foldable support and movable bodily with the platen carriage from a normal operative position to a more compact inoperative position at the rear of the type segment, and a universal bar mounted on said foldable support and adapted to be operated by the type bars, said universal bar being operatively connected at all times with the escapement mechanism and being movable with the support from a normal operative position above the type segment rearwardly and downwardly to an inoperative position at the rear of the type segment.

77. In a typewriting machine, the combination of a substantially rectangular base frame part, a substantially rectangular movable frame part pivotally held adjacent its forward end to the forward end of the base frame part, a platen carrriage supported at the rear of the movable frame part, a key action and type bars mounted on the base frame part, an escapement mechanism mounted in its entirety on the movable frame part, means for supporting the movable frame part with its rear end in an elevated position to support the carriage and escapement mechanism in an operative position with relation to the type bars, said movable frame part being movable downwardly to a more compact position about the base frame part to reduce the height of the machine and to move the carriage and escapement mechanism relatively to the key action and type bars from their normal elevated operative position into a more compact and inoperative position with relation to the type bars.

78. In a visible typewriting machine, the combination of a type action, a support therefor, a second and movable support, a platen carriage mounted upon said second support, escapement mechanism, a universal bar operatively connected to the escapement mechanism and mounted with said mechanism on said movable support, and means that enable said second support to be moved relatively to the other support to place the parts mounted upon one support into an inoperative position relative to the parts mounted upon the other support.

79. In a visible typewriting machine, the combination of a keyboard and type bars operated by individual keys of the keyboard, a platen carriage movable from a normal operative position to a more compact one, escapement mechanism, a universal bar operatively connected to the escapement mechanism and adapted to be moved by the type bars during the printing operation, a vertically arranged space lever adapted also to engage the universal bar, operative connections between the space bar and the space lever, said universal bar being movable with the platen carriage relatively to the space lever from a normal operative position to a more compact one.

80. In a visible typewriting machine, the combination of type bars, a keyboard having keys operating individual type bars, a platen carriage movable from a normal operative position to an abnormal compact and inoperative one, a universal bar partaking of the compact movement of the platen carriage, an escapement mechanism operatively connected to the universal bar and adapted to control the platen carriage, a space lever adapted to operate the universal bar, a link connected to the space lever, a lever connected to the link, a space bar, means for supporting the space bar, and a link connecting the space bar supporting means to said lever to adapt the space bar to operate the space lever at each depression thereof.

81. In a visible typewriting machine, the combination of type bars, a keyboard having keys operating individual type bars, a platen carriage movable from a normal operative position to an abnormal compact and inoperative one, a universal bar partaking of the compact movement of the platen carriage, an escapement mechanism operatively connected to the universal bar and adapted to control the letter feed movement of the platen carriage, a vertically arranged space lever adapted to operate the universal bar, a link connected to the space lever, a space bar, and operative connections between the space bar and the link.

82. In a visible typewriting machine, the combination of a keyboard having keys, type bars operated by individual keys, a platen carriage, a space lever, a space bar operatively connected to the space lever, an escapement mechanism, and a universal bar adapted to be operated by the space lever and type bars and movable with the carriage and the escapement mechanism relatively to the space lever and type bars from a normal operative position to a more compact one.

83. In a visible typewriting machine, the combination of a keyboard, upwardly and rearwardly movable type bars operatively connected with the keys of the keyboard, a platen carriage movable from a normal elevated operative position to a more compact lower inoperative position, an escapement mechanism, a space lever, a space bar operatively connected with the space lever, and a universal bar adapted to be operated by the space lever and the type bars and movable with the carriage and the escapement mechanism from a normal elevated operative position downwardly to a more compact inoperative position at the rear of the space lever and type bars.

84. In a compactible typewriting machine, the combination of a two-part support, one part constituting a base frame member and the other being pivoted to the base frame member and in operative position extending upwardly above the rear part of the base member, a platen carriage, a platen, an escapement, an operating element connected to said escapement, all of said elements being mounted on the pivoted frame part, key actuated means mounted on the base frame part and adapted to engage the escapement operating element, the pivoted member of the supporting frame being so secured to the base frame part as to be swung in an arc downwardly and rearwardly at the rear of the base frame part to make the machine more compact, and to be swung upwardly and forwardly to place the platen in printing position and to bring the operating element of the escapement in position to be engaged by the key actuated means on the base frame part, the two supporting members maintaining all of the operative elements in their upright positions during the act of compacting as well as extending the machine.

85. In a compactible typewriting machine, the combination of a two-part support, one part constituting a base frame member and the other being pivoted to the base frame member and in operative position extending upwardly above the rear part of the base member, a platen carriage, a platen, an escapement, all of said elements being mounted on the pivoted frame part, key actuated means mounted on the base frame part and adapted to operate the escapement, the pivoted member of the two-part support being so secured to the base frame part as to be swung in an arc downwardly and rearwardly at the rear of the base frame part to make the machine more compact and to be swung upwardly and forwardly in an arc to place the platen in printing position, and to bring the escapement in position to be operated by the key actuated means on the base frame part, the two supporting members maintaining all of the operative elements in their upright positions during the act of compacting as well as extending the machine.

86. In a compactible typewriting machine, the combination of a two-part support, one part constituting a base frame member and the other part being pivoted to the base frame member and in operative position extending upwardly above the rear of the base member, a platen carriage, a platen, an escapement, and a universal bar connected to the escapement all being mounted on the pivoted frame part, key actuated means mounted on the base frame part and adapted to engage the universal bar, the pivoted member of the two-part support being so secured to the base frame part as to be swung in an arc downwardly and rearwardly at the rear of the base frame part to make the machine more compact and to be swung upwardly and forwardly in an arc to place the platen in printing position and to bring the universal bar in position to be engaged by the key actuated means on the base frame part, the two supporting members maintaining all of the operative elements in their upright positions during the act of compacting as well as extending the machine.

87. In a compactible typewriting machine, the combination of a two-part support, one part constituting a base frame member and the other part being pivoted to the base frame member and in operative position extending upwardly above the rear of the base member, a platen carriage, a platen, an escapement, and a universal bar connected to the escapement, all being mounted on the pivoted frame part, type bars mounted on the base frame part and adapted to engage the universal bar when moved to printing position, the pivoted member of the two-part support being so secured to the base frame part as to be swung in an arc downwardly and rearwardly at the rear of the base frame part to make the machine more compact and to be swung upwardly and forwardly in an arc to place the platen in printing position and to bring the universal bar in position to be engaged by the type bars on the base frame part, the two supporting members maintaining all of the operative elements in their upright positions during the act of compacting as well as extending the machine.

88. In a typewriting machine, the combination of a base frame, type bars mounted on the base frame, a key-operated means for actuating the type bars, a platen, a carriage, a carriage bed, an escapement mechanism supported in fixed relation to the carriage bed, means held to the carriage bed and pivotally connected with the base frame adapted to normally hold the bed in an elevated position to support the platen in the path of the type bars, said means being movable to shift the bed and carriage together with the escapement mechanism rearwardly and downwardly while upright to a lower position at the rear of and out of the path of the type bars, and an actuating device for the escapement mechanism adapted to be engaged by the type bars during the printing movement thereof when the platen is in its elevated position and mounted to move with the platen out of the path of the type bars.

89. In a collapsible typewriting machine, the combination of a base frame, type, key-operated levers mounted on the base frame and operatively connected to move the type, a platen, a platen carriage, a carriage bed, means held to the bed and pivotally connected with the base frame adapted to hold the platen in an elevated position above and at the rear of the keys and shiftable to move the platen and carriage rearwardly and downwardly to a lower position at the rear of the keys, escapement mechanism for the carriage supported to move with the carriage bed, an actuating device operatively connected with the escapement mechanism and supported to move with the carriage bed, and means operated by the key-operated levers and mounted on the base frame adapted to engage and operate the escapement actuating device when the carriage bed is supported in its elevated position.

In testimony whereof I hereunto affix my signature this 18th day of May, 1918.

EMMIT G. LATTA.

Witnesses:

LURA B. LATTA,

CHAS. H. YOUNG.